US010715733B2

(12) United States Patent
Shiohara

(10) Patent No.: US 10,715,733 B2
(45) Date of Patent: *Jul. 14, 2020

(54) IMAGING APPARATUS, IMAGING-DISPLAYING APPARATUS, AND CONTROL METHOD THEREOF

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,744

(22) Filed: Jan. 15, 2019

(65) Prior Publication Data

US 2019/0149738 A1 May 16, 2019

Related U.S. Application Data

(63) Continuation of application No. 15/325,473, filed as application No. PCT/JP2015/003597 on Jul. 16, 2015, now Pat. No. 10,225,476.

(30) Foreign Application Priority Data

Jul. 22, 2014 (JP) ................. 2014-148877

(51) Int. Cl.
H04N 5/232 (2006.01)
H04N 5/06 (2006.01)
(Continued)

(52) U.S. Cl.
CPC ........... *H04N 5/23293* (2013.01); *H04N 5/06* (2013.01); *H04N 5/3765* (2013.01); *H04N 5/2228* (2013.01)

(58) Field of Classification Search
CPC .... H04N 5/23293; H04N 5/06; H04N 5/3765; H04N 5/2228
See application file for complete search history.

(56) References Cited

U.S. PATENT DOCUMENTS 10,225,476 B2 * 3/2019 Shiohara .................. H04N 5/06
2007/0211153 A1 9/2007 Uchida et al.
(Continued)

FOREIGN PATENT DOCUMENTS

EP 2388771 A2 11/2011
JP 2003-216136 A 7/2003
(Continued)

OTHER PUBLICATIONS

The Extended European Search Report for the corresponding European Patent Application No. 15824529.0 dated Feb. 16, 2018.

Primary Examiner — Twyler L Haskins
Assistant Examiner — Fayez Bhuiyan
(74) Attorney, Agent, or Firm — Global IP Counselors, LLP

(57) ABSTRACT

An imaging apparatus includes an imaging unit, a storage unit, an image processing unit, an image signal output unit, and a timing control unit. The timing control unit generates a first vertical synchronizing signal for driving the imaging unit and supplies the first vertical synchronizing signal to the imaging unit, and generates a second vertical synchronizing signal which is obtained by delaying the first vertical synchronizing signal at least by a predetermined time which is variable according to contents of the image processing performed and supplies the second vertical synchronizing signal to the display unit. The timing control unit controls the image signal output unit so that the image signal is read from the storage unit by being delayed by a phase difference between the first vertical synchronizing signal and the (Continued)

second vertical synchronizing signal, after outputting of the imaging signal from the imaging unit.

8 Claims, 8 Drawing Sheets

(51) Int. Cl.
*H04N 5/376* (2011.01)
*H04N 5/222* (2006.01)

(56) References Cited

U.S. PATENT DOCUMENTS

| | | |
|---|---|---|
| 2009/0225197 A1 | 9/2009 | Takahashi et al. |
| 2011/0285694 A1 | 11/2011 | Shiohara |
| 2011/0285734 A1 | 11/2011 | Shiohara |
| 2011/0285894 A1 | 11/2011 | Shiohara et al. |
| 2016/0021324 A1 | 1/2016 | Irie |
| 2017/0223307 A1 | 8/2017 | Ono |

FOREIGN PATENT DOCUMENTS

| | | |
|---|---|---|
| JP | 2006-129275 A | 5/2006 |
| JP | 2007-243615 A | 9/2007 |
| JP | 2007-295096 A | 11/2007 |
| JP | 2010-268388 A | 11/2010 |
| JP | 2011-244170 A | 12/2011 |
| JP | 2011-249963 A | 12/2011 |

* cited by examiner

IMAGING APPARATUS, IMAGING-DISPLAYING APPARATUS, AND CONTROL METHOD THEREOF

CROSS-REFERENCE TO RELATED APPLICATIONS

This application is a continuation application of U.S. patent application Ser. No. 15/325,473, filed on Jan. 11, 2017. This application claims priority to Japan Patent Application No. 2014-148877 filed Jul. 22, 2014, the entire disclosures of U.S. patent application Ser. No. 15/325,473 and Japan Patent Application No. 2014-148877 are hereby incorporated herein by reference in their entireties.

TECHNICAL FIELD

The present invention relates to an imaging apparatus, imaging-displaying apparatus, and a control method thereof.

BACKGROUND ART

In a so-called mirrorless digital camera, it is possible to check an image of an object using a so-called live view operation in which an image which is imaged using an image sensor such as a Charge Coupled Device (CCD), or a Complementary Metal-Oxide Semiconductor (CMOS) image sensor, and corresponding to an image signal is displayed on a liquid crystal panel which is provided on the rear surface of a housing, an electronic viewfinder (hereinafter, referred to as EVF) which is built in at a higher part of the housing, or the like, in real time.

However, in the live view operation, a remarkable delay occurs during a time from imaging of an object using an image sensor to a display on a view finder, or the like. For this reason, it is difficult to cause a camera to face and follow a moving object. In addition, when imaging of a still image is instructed based on an image of an object which is displayed, deviation in timing occurs between the displayed image of the object and an image of the still image which is imaged, and when it is an object which moves fast, in particular, it is difficult to image a desired still image.

Therefore, an effort of reducing a delay in time from imaging using an image sensor to a display using a display unit such as a view finder has been made.

For example, an imaging-displaying apparatus which is described in JP-A-2007-243615 generates a vertical synchronizing signal which defines an operation timing of the image sensor by generating a signal for defining an operation timing of a display unit, and by delaying the signal only for a predetermined time. In this manner, it is possible to shorten a delay in time from a signal output using the image sensor to a display of an image based on the signal, by causing a constant phase difference between the vertical synchronizing signal of the image sensor and a vertical synchronizing signal of the display unit.

SUMMARY

Meanwhile, in general, in an imaging-displaying apparatus, an object is imaged in order of live view→main photographing→quick view→live view. In these operations, in any case, an image sensor becomes a reference in timing by being firstly operated. That is, there is not a case in which a display unit is operated before the image sensor. In addition, when an automatic exposure or automatic white balance is executed, it is possible for a user to grasp an image which is photographed in main photographing when a processed image is displayed on the display unit, after executing the process by operating the image sensor. For this reason, it is desirable to operate the image sensor before the display unit.

However, in the related art, since a signal for defining an operation timing of the display unit is firstly generated, and a vertical synchronizing signal of the image sensor is generated thereafter, there was a problem in that it was not possible to cause reading of the image sensor to be performed immediately after a generation of a vertical synchronizing signal of the display unit, and a delay in time occurred when displaying an image on the display unit.

The present invention has been made in order to solve the above described problem, and an object thereof is to shorten a delay in time until an image is displayed on the display unit.

According to one aspect, an imaging apparatus includes an imaging unit, a storage unit, an image processing unit, an image signal output unit, and a timing control unit. The imaging unit outputs an imaging signal denoting a captured image. The image processing unit generates an image signal by performing image processing with respect to the imaging signal, and writes the image signal in the storage unit. The image signal output unit reads the image signal from the storage unit, and outputs the image signal to a display unit. The timing control unit generates a first vertical synchronizing signal for driving the imaging unit and supplies the first vertical synchronizing signal to the imaging unit, and generates a second vertical synchronizing signal which is obtained by delaying the first vertical synchronizing signal at least by a predetermined time which is variable according to contents of the image processing performed and supplies the second vertical synchronizing signal to the display unit. The timing control unit controls the image signal output unit so that the image signal is read from the storage unit by being delayed by a phase difference between the first vertical synchronizing signal and the second vertical synchronizing signal, after outputting of the imaging signal from the imaging unit.

DESCRIPTION OF EMBODIMENTS

An embodiment of the present invention will be described with reference to drawings. However, in each figure, dimensions and scales of each unit are set to be suitably different from actual dimensions and scales. In addition, since the embodiment which will be described below is a preferable specific example of the present invention, the embodiment is subjected to various preferable technical limitations; however, the scope of the present invention is not limited to the embodiment, when there is no specific description which limits the invention in the following descriptions.

1. Configuration of Imaging-Displaying Apparatus

Figure 1:
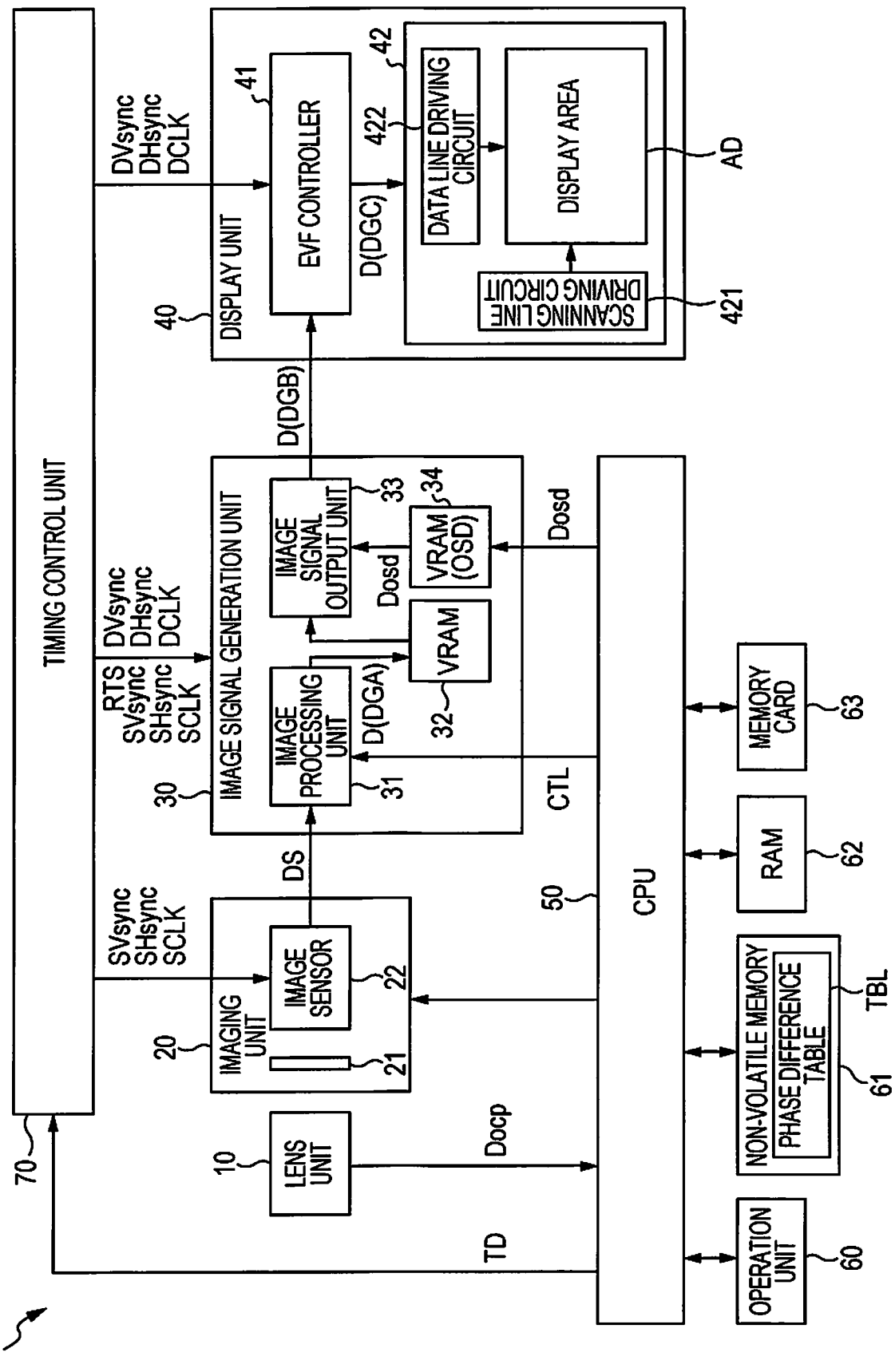
FIG. 1 is a block diagram which illustrates a configuration of an imaging-displaying apparatus according to an embodiment of the present invention.

FIG. 1 is a block diagram which illustrates functions of an imaging-displaying apparatus 1.

As illustrated in FIG. 1, the imaging-displaying apparatus 1 includes a lens unit 10 which forms an image of an object, an imaging unit 20 which images the object, and outputs data which is obtained by imaging the object as an imaging signal DS, an image signal generation unit 30 which generates an image signal D by performing image processing with respect to the imaging signal DS, a display unit 40 which displays an image corresponding to the image signal D, a central processing unit (CPU) 50 which controls the entire apparatus, an operation unit 60 for inputting a change in setting of the imaging-displaying apparatus 1, an instruction of imaging, or the like, a non-volatile memory 61 for storing a boot program or a phase difference table TBL, a random access memory (RAM) 62 which functions as a working region of the CPU 50, a memory card 63 for storing still image data, a VRAM 34 for storing an OSD image signal Dosd, and a timing control unit 70 for generating various timing signals. The CPU 50 generates the OSD image signal Dosd which denotes photographing conditions, or the like, such as a shutter speed, a backlight correction, and a diaphragm value, and stores the image signal in the VRAM 34 which will be described later. In addition, in the following descriptions, a configuration in which the lens unit 10 is excluded from the imaging-displaying apparatus 1 will be referred to as a main body.

The imaging-displaying apparatus 1 is a so-called mirrorless digital single lens reflex camera, and in which it is possible to exchange the lens unit 10. In addition, it is possible to select an operation using a live view mode in which an image related to an object which is imaged in the imaging unit 20 is displayed on the display unit 40 approximately in real time due to an operation of the operation unit 60 by a user of the imaging-displaying apparatus 1, and an operation using an imaging mode in which an image related to an object which is imaged in the imaging unit 20 is stored in the memory card 63 for storing a still image as still image data.

The imaging unit 20 includes a mechanical shutter 21, and an image sensor 22 which line-sequentially scans signals from light receiving elements (imaging elements) which are arranged in a matrix, and outputs the signals as imaging signals DS corresponding to an object image.

Subsequently, the image signal generation unit 30 includes an image processing unit 31 which generates an image signal D (DGA) based on the imaging signal DS, a VRAM 32 which temporarily stores the image signal D (DGA), and an image signal output unit 33 which outputs the image signal D (DGB) obtained by compositing the image signal D (DGA) which is read from the VRAM 32 and the OSD image signal Dosd to the display unit 40. In addition, in the following descriptions, the image signal D (DGB) is simply denoted by the image signal D.

Subsequently, the display unit 40 is an electronic view finder (EVF) for allowing a user of the imaging-displaying apparatus 1 to grasp a state of an object by displaying an image denoting the object which is an imaging target, and includes a liquid crystal panel 42 for displaying an image corresponding to the image signal D which is generated by the image signal generation unit 30, and an EVF controller 41 which controls operations of the liquid crystal panel 42.

A display area AD for displaying an image corresponding to the image signal D is provided in the liquid crystal panel 42. The display area AD is configured by including scanning lines of M rows which extend in the X axis direction, data lines of N columns which extend in the Y axis direction, and pixels of M rows*N columns which are also received corresponding to intersecting of a scanning line and a data line (refer to FIG. 2C). In addition, the liquid crystal panel 42 includes a scanning line driving circuit 421 for selecting the scanning line, a data line driving circuit 422 for driving the data line, and an optical system (not illustrated) which magnifies an image displayed on the display area AD so as to be viewed. In addition, each of pixels of M rows*N columns which is arranged in the display area AD corresponds to colors of RGB, and can be displayed as a color.

Figure 2A:
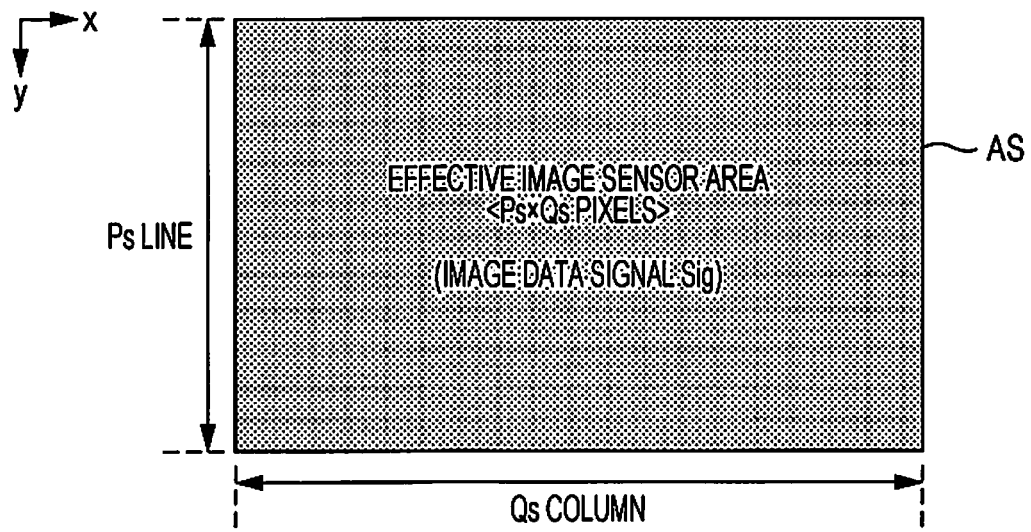
FIG. 2A is an explanatory diagram which describes a relationship between an effective image sensor area and a display area.

As illustrated in FIG. 2A, in the image sensor 22, a plurality of light receiving elements are arranged in a matrix so as to be QS columns in the X axis direction (horizontal direction), and PS rows (PS lines) in the Y axis direction (vertical direction) intersecting the X axis direction in the effective image sensor area AS (PS and QS are natural numbers of two or more). In other words, the effective image sensor area AS is configured so that lines which are formed of QS light receiving elements which are arranged in the X axis direction are aligned by PS rows in the Y axis direction. Each light receiving element generates a pixel data signal Sig corresponding to a detected light intensity.

In addition, a color filter of any one color of red, green, and blue is provided so as to perform one-to-one correspondence with respect to each light receiving element. Hereinafter, a set of one light receiving element and a color filter which is provided corresponding to the one light receiving element is referred to as a pixel of the image sensor 22.

When the imaging-displaying apparatus 1 is operated in an imaging mode, the image sensor 22 can output all of pixel data signals Sig which are output from light receiving elements of PS rows*QS columns which are provided in the effective image sensor area AS as still image imaging data. In addition, when the still image imaging data is output, the image signal generation unit 30 which will be described later generates still image data by performing various image processes such as a filtering process with respect to the still image imaging data, and the generated still image data is stored in the memory card 63 for storing a still image.

Figure 2B:
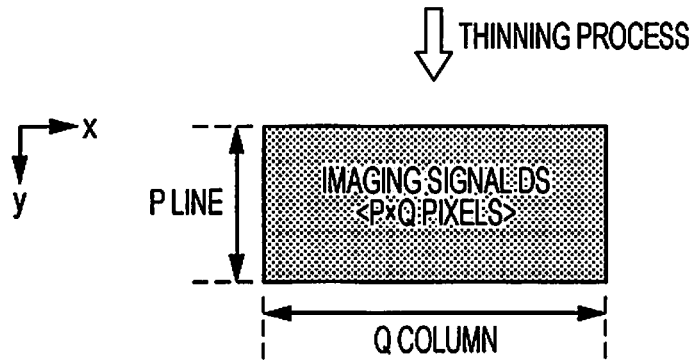
FIG. 2B is an explanatory diagram which describes a relationship between an effective image sensor area and a display area.

Meanwhile, when the imaging-displaying apparatus 1 is operated in the live view mode, the image sensor 22 reduces a data size of the pixel data signal Sig by performing a thinning process with respect to the pixel data signal Sig which is output from the light receiving elements of PS rows*QS columns, and outputs the pixel data signal as the imaging signal DS corresponding to pixels of P rows*Q columns as illustrated in FIG. 2B (P is a natural number equal to or larger than 2 and equal to or smaller than PS, Q is natural number equal to or larger than 2 and equal to or smaller than QS).

In addition, the image sensor 22 may include a pixel in an area other than the effective image sensor area AS; however, for simplifying the specification, descriptions of pixels in the effective image sensor area AS are omitted.

Figure 2C:
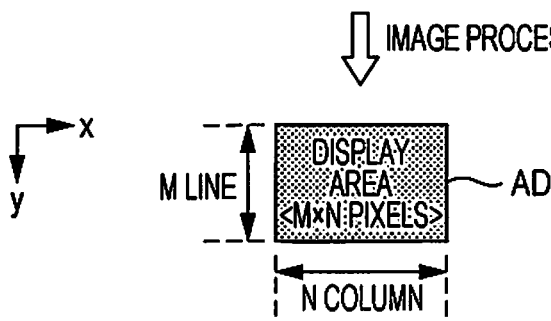
FIG. 2C is an explanatory diagram which describes a relationship between an effective image sensor area and a display area.

In addition, as illustrated in FIG. 2C, a plurality of pixels are arranged in a matrix so as to be N columns in the X axis direction, and M rows (M lines) in the Y axis direction in the display area AD (M is natural number equal to or larger than 2 and equal to or smaller than P, N is natural number equal to or larger than 2 and equal to or smaller than Q), in the liquid crystal panel 42. In other words, the display area AD is configured so that lines which are formed of N pixels which are arranged in the X axis direction are aligned by M rows in the Y axis direction. These pixels of M rows*N columns include pixels for displaying a red color, pixels for displaying a green color, and pixels for displaying a blue color. An image corresponding to the image signal D which is generated by the image signal generation unit 30 is displayed in the display area AD.

As described above, M is equal to or smaller than P, and N is equal to or smaller than Q. That is, there is a case in which the number of effective pixels which are provided in the effective image sensor area AS and the number of pixels which are provided in the display area AD are different from each other.

In addition, coordinate systems which are illustrated in FIGS. 2A to 2C are respectively a coordinate system which is fixed to the effective image sensor area AS, a conceptual coordinate system for displaying the imaging signal DS, and a coordinate system which is fixed to the display area AD, and a direction of each axis of these three coordinate systems may be different from each other.

The above described image signal D is a signal for defining images (gradation) to be displayed using pixels of M rows*N columns which are provided in the display area AD of the liquid crystal panel 42. Hereinafter, an image signal D of one line which denotes an image to be displayed using a line of the mth row of the display area AD among image signals D which denote an image to be displayed in the display area AD is denoted by an image signal D[m] (m is natural number equal to or larger than 1 and equal to or smaller than M).

Subsequently, the timing control unit 70 illustrated in FIG. 1 generates an imaging vertical synchronizing signal SVsync (first vertical synchronizing signal), an imaging horizontal synchronizing signal SHsync, and an imaging dot clock signal SCLK (first clock signal), outputs these signals to the image sensor 22, and generates a display vertical synchronizing signal DVsync (second vertical synchronizing signal), a display horizontal synchronizing signal DHsync, and a display dot clock signal DCLK with a frequency different from the imaging dot clock signal SCLK (second clock signal), and outputs these signals to the EVF controller 41.

Figure 3:
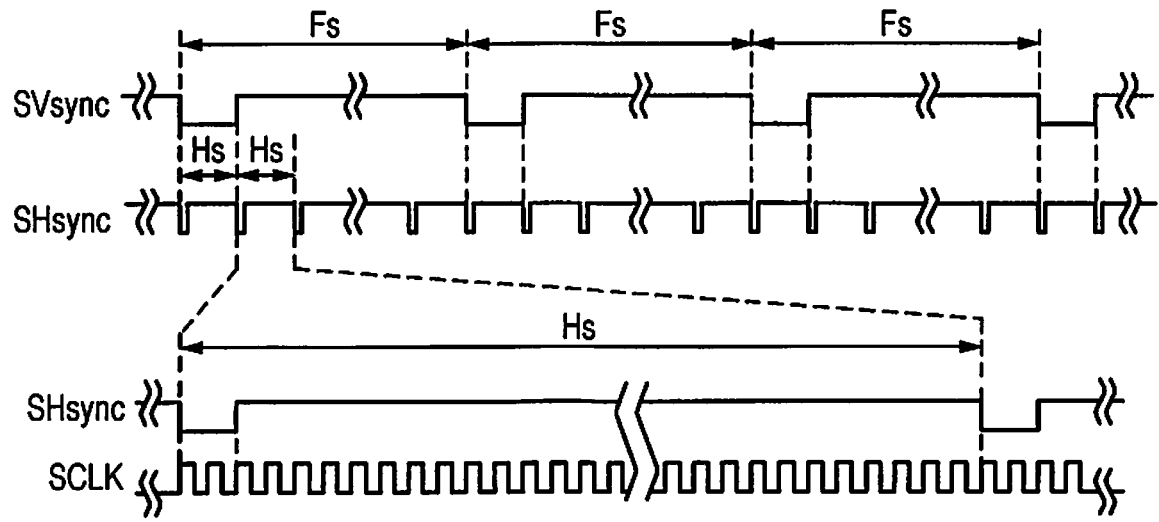
FIG. 3 is a timing chart for describing operations of the imaging-displaying apparatus.

FIG. 3 is a timing chart for describing the imaging vertical synchronizing signal SVsync, the imaging horizontal synchronizing signal SHsync, and the imaging dot clock signal SCLK which are generated by the timing control unit 70. The imaging vertical synchronizing signal SVsync is a signal for defining a vertical scanning period Fs (that is, frame period of imaging unit 20) for reading the pixel data signal Sig from light receiving elements in the entire effective image sensor area AS (PS lines) of the image sensor 22. The imaging horizontal synchronizing signal SHsync is a signal for defining a horizontal scanning period Hs for reading the pixel data signal Sig from light receiving elements of one line of the effective image sensor area AS. The imaging dot clock signal SCLK is a signal for defining timing for reading the pixel data signal Sig from a light receiving element of one pixel of the effective image sensor area AS.

Figure 4:
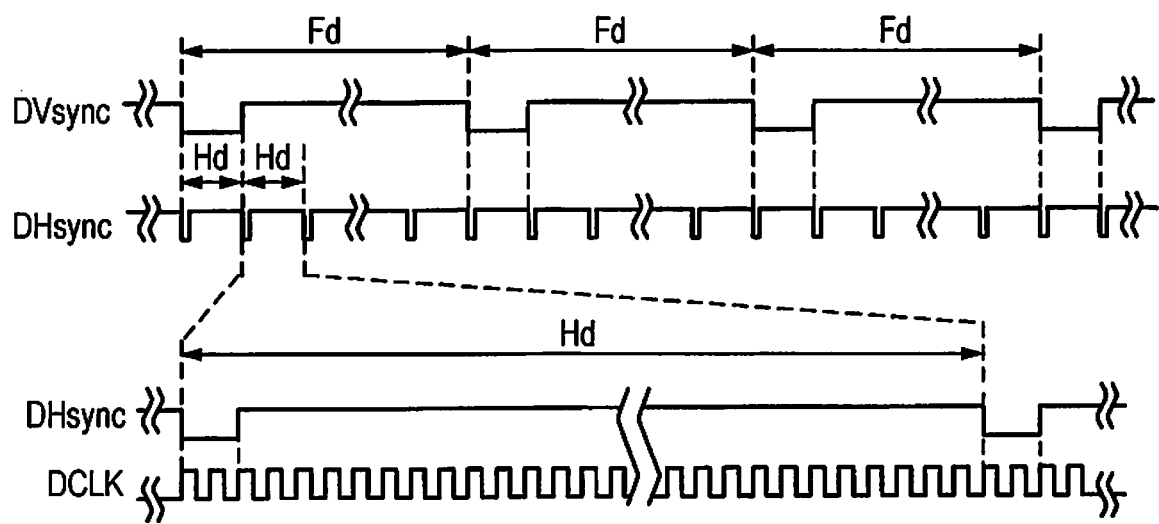
FIG. 4 is a timing chart for describing operations of the imaging-displaying apparatus.

FIG. 4 is a timing chart for describing the display vertical synchronizing signal DVsync, the display horizontal synchronizing signal DHsync, and the display dot clock signal DCLK which are generated by the timing control unit 70. The display vertical synchronizing signal DVsync is a signal for defining a vertical scanning period Fd (that is, frame period of display unit 40) for displaying an image of pixels of the entire display area AD (M lines) of the liquid crystal panel 42. The display horizontal synchronizing signal DHsync is a signal for defining a horizontal scanning period Hd for displaying an image using pixels of one line of the display area AD. The display dot clock signal DCLK is a signal for defining timing for displaying an image using each pixel of the display area AD.

According to the embodiment, duration of the vertical scanning period Fs in the image sensor 22, and duration of the vertical scanning period Fd in the display unit 40 are set to be equal. On the other hand, duration of the horizontal scanning period Hs and duration of the horizontal scanning period Hd are set to be different from each other.

In addition, the timing control unit 70 outputs various timing signals with respect to the image signal generation unit 30, and the imaging vertical synchronizing signal SVsync, the imaging horizontal synchronizing signal SHsync, the imaging dot clock signal SCLK, the display vertical synchronizing signal DVsync, the display horizontal synchronizing signal DHsync, and the display dot clock signal DCLK are included therein.

Figure 5:
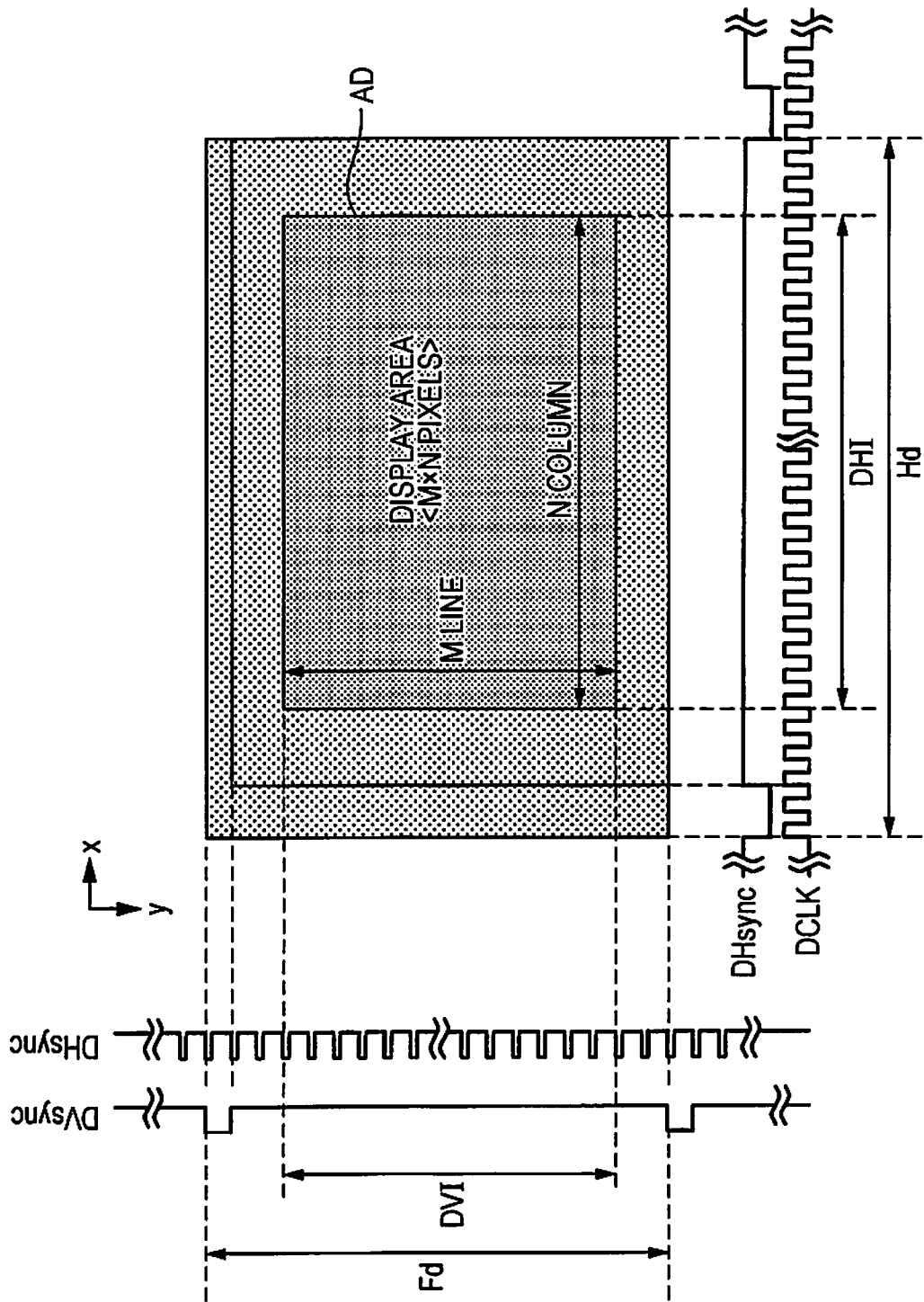
FIG. 5 is an explanatory diagram for describing the display area.

FIG. 5 is an explanatory diagram for describing a relationship between various signals which are generated by the timing control unit 70 and display timing of an image in the display area AD of the liquid crystal panel 42.

As illustrated in the figure, pixels of M rows*N columns from the line of the first row to the line of the Mth row in the display area AD display an image of one screen which is denoted by image signals D[1] to D[m] in a vertical effective data period DVI in a vertical scanning period Fd.

In addition, N pixels which configure a line of the mth row in the display area AD display an image denoted by the image signal D[m] in the horizontal effective data period DHI in a horizontal scanning period Hd.

Figure 6:
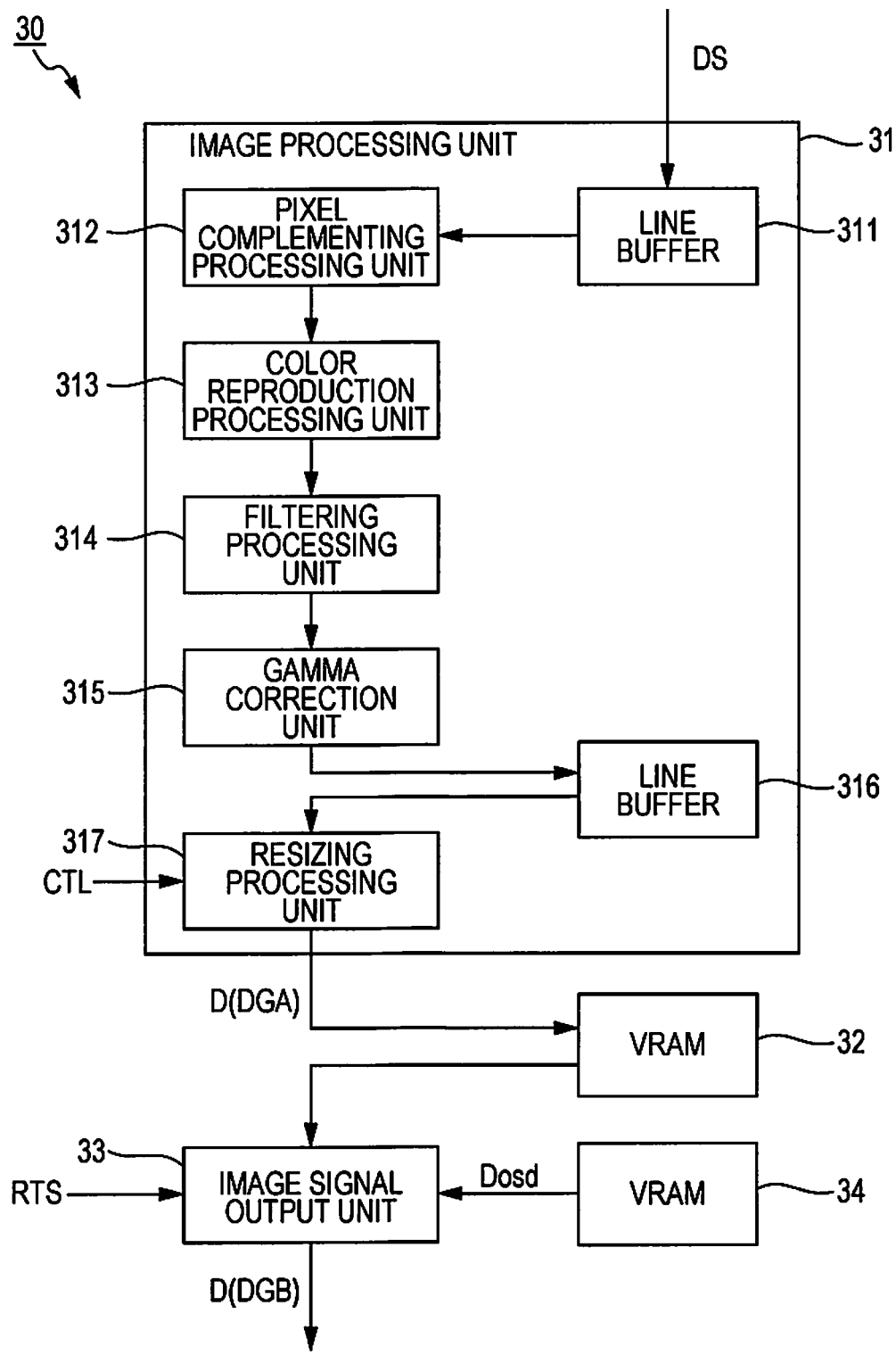
FIG. 6 is a block diagram which illustrates a configuration of an image signal generation unit.

FIG. 6 is a block diagram which illustrates a configuration of the image processing unit 31. As illustrated in the figure, the image processing unit 31 includes line buffer 311 which temporarily stores the imaging signal DS which is output from the image sensor 22, a pixel complementing processing unit 312 which performs a color information complementing process of omitted color information with respect to the imaging signal DS which is stored in the line buffer 311, a color reproduction processing unit 313 which performs a color reproduction process (calculation process of 3*3 matrices) with respect to the complemented imaging signal DS, a filtering processing unit 314 which performs a filtering process with respect to the imaging signal DS which is subjected to the color reproduction, a gamma correction unit 315 which performs a gamma correction with respect to the imaging signal DS which is subjected to the filtering process, a line buffer 316 which temporarily stores the imaging signal DS which is subjected to the gamma correction, and a resizing processing unit 317 which performs a resizing process in which the imaging signal DS which is stored in the line buffer 316 is converted into image signals D of the number of pixels included in the display area AD.

As described above, the number of pixels of an image denoted by the imaging signal DS, and the number of pixels of an image denoted by the image signal D (the number of pixels in display area AD) are different from each other. For this reason, a resizing process of converting the imaging signal DS into an image signal D corresponding to the number of pixels in the display area AD is executed in the resizing processing unit 317.

There is a case in which an image denoted by the imaging signal DS includes various aberrations such as distortion aberration or chromatic aberration which is caused by optical characteristics of the lens unit 10. As the distortion aberration, specifically, there is barrel aberration in which an image which denotes an imaging result when imaging an object expands toward the outside compared to an image to be originally displayed in the display area AD, or pincushion aberration in which an image is contracted toward the inside compared to an image to be originally displayed.

In addition, chromatic aberration is a phenomenon in which, when an image is formed through a lens, an image forming position is shifted due to a color; however, there is axial chromatic aberration in which focusing fails in each color, and there is a color blur in an image, and chromatic aberration of magnification in which image height is shifted (magnification is changed) when there is a change in principal point or focal distance due to a color. Both are caused by a difference in color wavelength of a ray component and a difference in refractive index of lenses. In a telephoto lens, the axial chromatic aberration easily occurs, and in a wide-angle lens, the chromatic aberration of magnification easily occurs. With respect to the chromatic aberration of magnification, when the image height increases, magnification becomes large in light with a long wavelength, and color shift increases at the peripheral portion of a screen. For this reason, in the resizing processing unit 317, a distortion aberration correction process in which distortion aberration such as barrel aberration, pincushion aberration, or the like, is corrected, and a chromatic aberration correction process in which chromatic aberration (particularly, chromatic aberration of magnification) is corrected are executed in the resizing process. When the resizing process is finished, and an image signal D is generated in each line, the resizing processing unit 317 stores the generated image signal D[m] of one line in the VRAM 32.

A degree of distortion aberration changes according to a parameter related to optical characteristics such as a type of the lens unit 10, a focal distance or a zooming rate, a diaphragm value, a focusing value, or the like (in particular, type of lens unit 10, and focal distance or zooming rate). Accordingly, it is preferable to obtain a parameter related to optical characteristics from the lens unit 10, and to change contents of the distortion aberration correction process.

It is preferable that a time from outputting of an imaging signal DS from the imaging unit 20 to outputting of an image signal D to the display unit 40 is short, since it is possible to shorten a display delay. Meanwhile, a time which is necessary for the above described image processing is changed according to contents of the distortion aberration correction process and the chromatic aberration correction process which are performed in the resizing processing unit 317. As described above, the timing control unit 70 generates the imaging vertical synchronizing signal SVsync, the imaging horizontal synchronizing signal SHsync, and the imaging dot clock signal SCLK which control the image sensor 22, and generates the display vertical synchronizing signal DVsync, the display horizontal synchronizing signal DHsync, and the display dot clock signal DCLK which control the display unit 40.

Here, starting of the frame of the imaging signal DS is defined using the imaging vertical synchronizing signal SVsync, and starting of the frame of the image signal D is defined using the display vertical synchronizing signal DVsync. Therefore, it is possible to shorten a display delay while securing a time necessary for the aberration correction process by changing a phase difference between the imaging vertical synchronizing signal SVsync and the display vertical synchronizing signal DVsync according to contents of the distortion aberration correction process and the chromatic aberration correction process which are executed in the resizing processing unit 317.

According to the embodiment, the CPU 50 obtains optical characteristic data Docp including a parameter related to optical characteristics from the lens unit 10. In addition, the optical characteristic data Docp, the phase difference TD, and contents of image processing are stored in the phase difference table TBL which is stored in the non-volatile memory 61 by being correlated with each other. The phase difference TD is a time difference between the imaging vertical synchronizing signal SVsync and the display vertical synchronizing signal DVsync, and denotes a time difference between starting of the frame of the imaging signal DS and starting of the frame of the image signal D. The CPU 50 specifies the phase difference TD corresponding to the optical characteristic data Docp, and contents of image processing by referring to the phase difference table TBL. The CPU 50 generates a correction process control signal CTL which designates contents of the distortion aberration correction process and the chromatic aberration correction process, supplies the signal to the resizing processing unit 317, and supplies the phase difference TD to the timing control unit 70.

Figure 7:
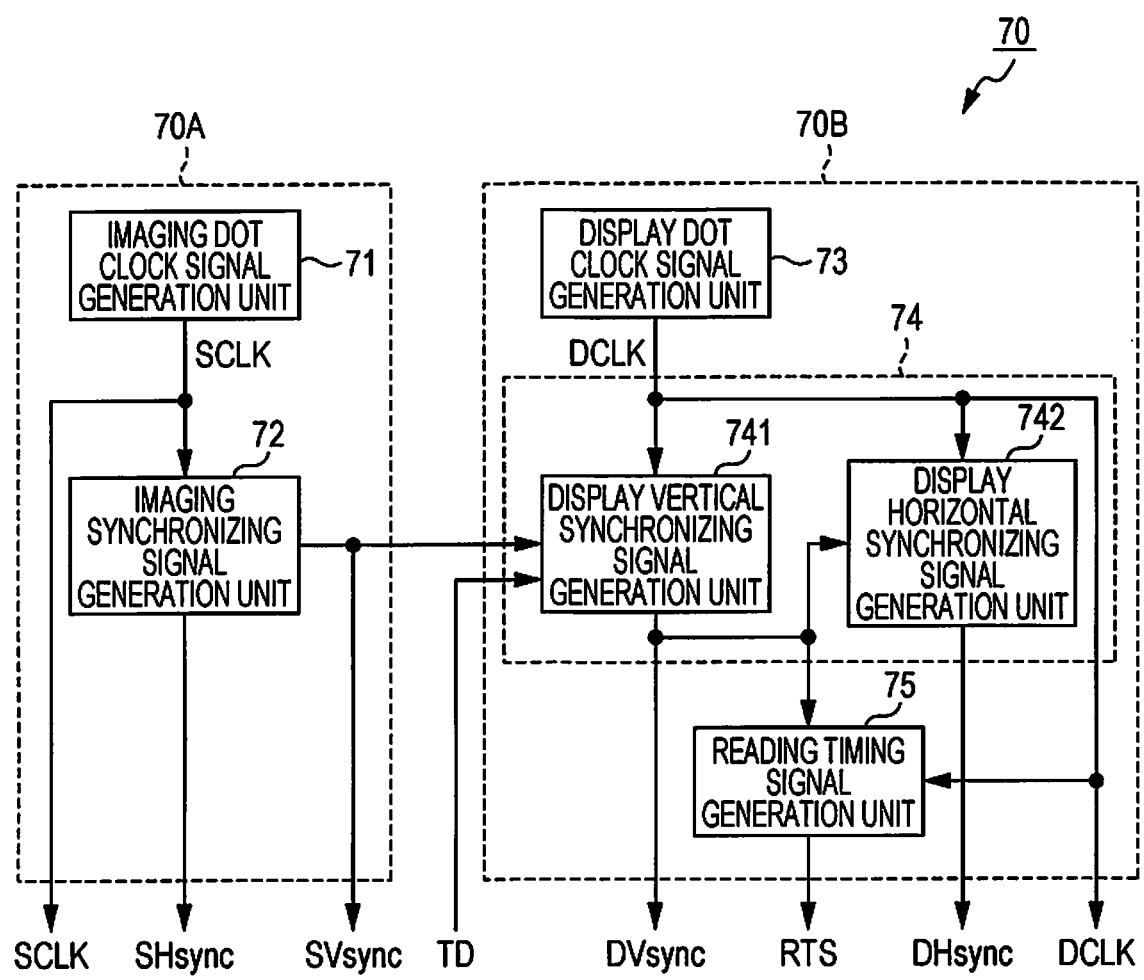
FIG. 7 is a block diagram which illustrates a configuration of a timing control unit.

A specific configuration of the timing control unit 70 will be described with reference to FIG. 7. As illustrated in FIG. 7, the timing control unit 70 includes a first timing generator 70A and a second timing generator 70B. The first timing generator 70A includes an imaging dot clock signal generation unit 71 which generates the imaging dot clock signal SCLK, and an imaging synchronizing signal generation unit 72 which generates the imaging vertical synchronizing signal SVsync and the imaging horizontal synchronizing signal SHsync based on the imaging dot clock signal SCLK.

In addition, the second timing generator 70B includes a display dot clock signal generation unit 73 which generates the display dot clock signal DCLK, a display synchronizing signal generation unit 74 which generates the display vertical synchronizing signal DVsync and the display horizontal synchronizing signal DHsync based on the display dot clock signal DCLK, and a reading timing signal generation unit 75 which generates a reading timing signal RTS which designates timing for reading the image signal D from the VRAM 32. In addition, the display synchronizing signal generation unit 74 includes a display vertical synchronizing signal generation unit 741, and a display horizontal synchronizing signal generation unit 742.

The display vertical synchronizing signal generation unit 741 generates the display vertical synchronizing signal DVsync by delaying the imaging vertical synchronizing signal SVsync by the phase difference TD. The phase difference TD may be determined according to an image processing time in the image processing unit 31. That is, when the image processing time is short, the phase difference TD is set to be small, and when an image processing time is long, the phase difference TD is set to be large.

The display vertical synchronizing signal generation unit 741 may have any configuration when it is possible to generate the display vertical synchronizing signal DVsync by delaying the imaging vertical synchronizing signal SVsync by the phase difference TD using the display dot clock signal DCLK. For example, it may be a configuration in which a rising edge of the display dot clock signal DCLK is counted using a counter which is reset when the imaging vertical synchronizing signal SVsync becomes active, a pulse which becomes active when a counting result reaches a predetermined number is generated, and the display vertical synchronizing signal DVsync is generated based on the pulse.

Alternatively, it may be a configuration in which a divided clock signal which is obtained by dividing the display dot clock signal DCLK is generated, the signal is supplied to K clock input terminals of a D flip-flop which are subjected to cascade connection, the imaging vertical synchronizing signal SVsync is supplied to the D flip-flop in the first stage, and an output signal of each D flip-flop is output by selecting the output signal according to the phase difference TD. For example, when one cycle of the divided clock signal is Tclk, and a time necessary for image processing is Tx, a value Z which is obtained by operating Tx/Tclk, and by rounding up a decimal point may be set to the phase difference TD. In this manner, it is possible to generate the display vertical synchronizing signal DVsync in which the imaging vertical synchronizing signal SVsync is delayed at least by a predetermined time which is necessary for image processing.

The reading timing signal generation unit 75 generates the reading timing signal RTS by delaying the display vertical synchronizing signal DVsync by the display dot clock signal DCLK, and supplies the reading timing signal RTS to the image signal output unit 33. The reading timing signal RTS controls the image signal output unit 33 so that the image signal D is read from the VRAM 32 by being delayed by the phase difference TD between the imaging vertical synchronizing signal SVsync and the display vertical synchronizing signal DVsync, after the imaging signal DS is output from the imaging unit 20.

Subsequently, the display horizontal synchronizing signal generation unit 742 which is illustrated in FIG. 7 generates one display horizontal synchronizing pulse by counting a predetermined number of the display dot clock signals DCLK from a falling edge of the display vertical synchronizing signal DVsync, and may generate the display horizontal synchronizing signal DHsync by repeating the above described process.

Figure 8:
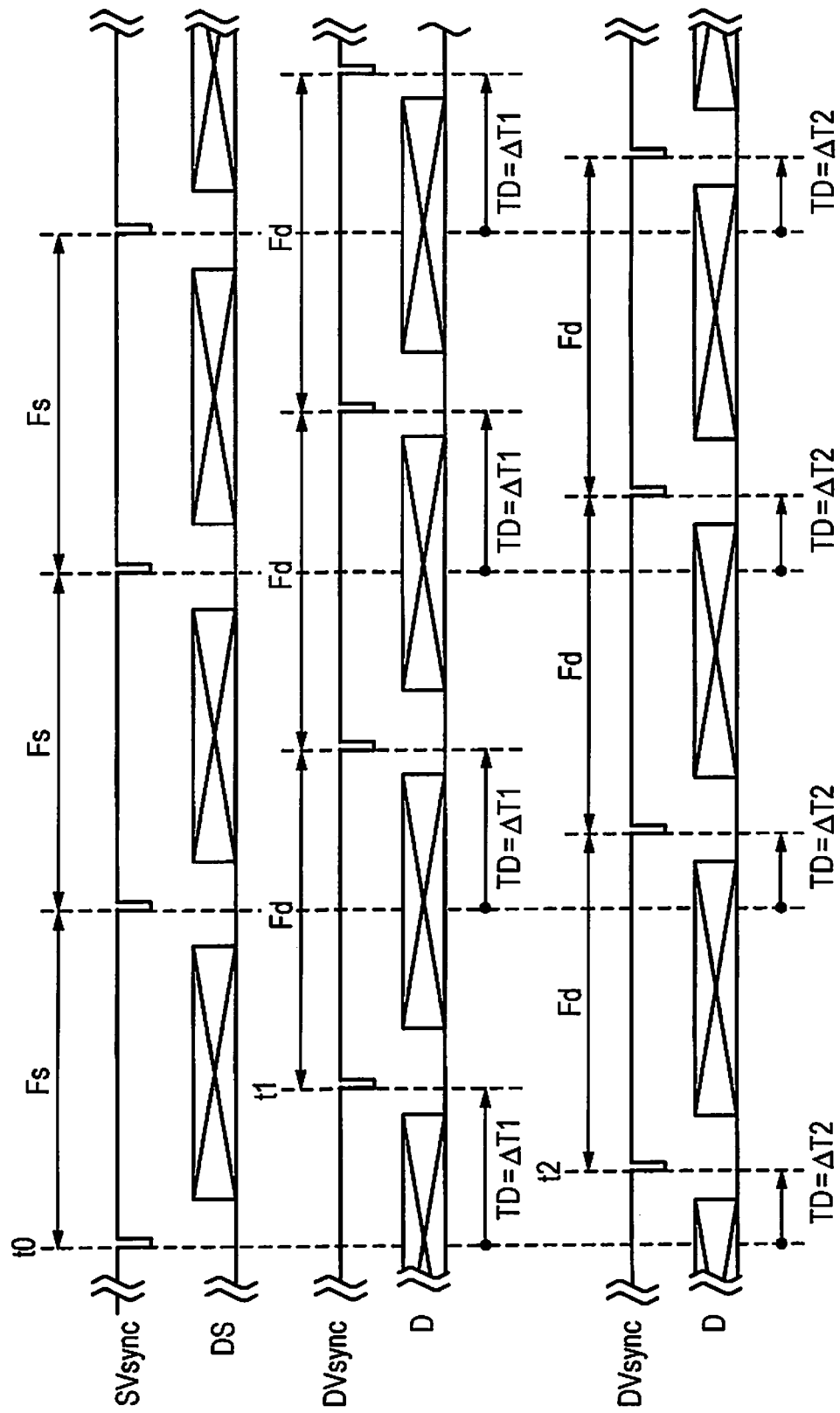
FIG. 8 is a timing chart for describing operations of the imaging-displaying apparatus.

FIG. 8 illustrates timing charts of the imaging vertical synchronizing signal SVsync, the imaging signal DS, the display vertical synchronizing signal DVsync, and the image signal D when the phase differences TD are deltaT1 and deltaT2. Here, a time t0 is a start time of a frame of the imaging signal DS, a time t1 is a start time of a frame of the image signal D when the phase difference TD is deltaT1, and a time t2 is a start time of a frame of the image signal D when the phase difference TD is deltaT2.

When the phase difference TD is deltaT2, it is, for example, a case in which an aberration correction process is not performed in the resizing processing unit 317. In this case, since the aberration correction process is not performed, the imaging signal DS which is written in the line buffer 316 is immediately read in the resizing processing unit 317, is resized, and is stored in the VRAM 32. In addition, duration of a frame period of the display unit 40 becomes the same duration of a frame period of the image sensor 22, and the image signal D is read from the VRAM 32 so that a time until the image signal D is output to the display unit 40 after the imaging signal DS is supplied to the image signal generation unit 30 becomes deltaT2.

When the phase difference TD is deltaT1 is, for example, a case in which the aberration correction process is performed in the resizing processing unit 317. In this case, imaging signals DS by the number of lines which is necessary for processing are stored in the line buffer 316 in order to perform the aberration correction process. In addition, the resizing processing unit 317 generates the image signal D for displaying with reference to the stored imaging signal DS, and stores the image signal D in the VRAM 32. In this case, since a line of the imaging signal DS to be referred to according to a position of a line of the image signal D as a processing target is different, generation timing of the image signal D is changed according to a line in the frame. Here, a time necessary for the aberration correction process becomes the maximum when the number of lines of the imaging signal DS to be referred to in order to generate the image signal D according to the line in the frame becomes the maximum. When the maximum time is set to tmax, deltaT1 becomes deltaT2+tmax. That is, when the image signals D[1] to D[M] of the first to mth lines are generated, the phase difference TD is determined by taking into consideration a maximum time tmax which is a processing time of a line with the maximum number of reference lines.

In this manner, according to the embodiment, the display vertical synchronizing signal DVsync is generated by delaying the imaging vertical synchronizing signal SVsync by the phase difference TD, and the display unit 40 is controlled using the display vertical synchronizing signal DVsync. For this reason, the image signal output unit 33 reads the image signal D from the VRAM 32 in synchronization with the display vertical synchronizing signal DVsync, and supplies the image signal D to the display unit 40.

In this manner, it is possible to set the phase difference TD from a start of a frame in the imaging unit 20 to a start of a frame of the display unit 40 according to contents of image processing, and to appropriately control a delay in time from imaging to displaying, while securing a time for image processing.

In addition, according to the embodiment, first, the imaging vertical synchronizing signal SVsync for controlling the imaging unit 20 is generated, and then the display vertical synchronizing signal DVsync for controlling the display unit 40 is generated by delaying the imaging vertical synchronizing signal SVsync. For this reason, it is possible to set duration of the frame period of the imaging unit 20 so as to match duration of the frame period of the display unit 40. It is possible to suppress deterioration in quality of a display image by putting the frame period of the imaging unit 20 before the frame period of the display unit 40.

In addition, when the display vertical synchronizing signal DVsync is firstly generated, and the imaging vertical synchronizing signal SVsync is generated thereafter, by delaying the display vertical synchronizing signal DVsync, it is not possible to generate the imaging signal DS, and to display an image immediately after supplying power, even when the imaging unit 20 can be operated. In contrast to this, it is possible to rapidly display an image immediately after supplying power, by generating the display vertical synchronizing signal DVsync by delaying the imaging vertical synchronizing signal SVsync.

In addition, in the imaging-displaying apparatus 1, in general, an object is photographed in order of live view- →main photographing→quick view→live view. In these operations, in any case, the image sensor 22 becomes a reference in timing by being firstly operated, and there is not a case in which the display unit 40 is operated before the image sensor 22. In addition, when an automatic exposure or automatic white balance is executed, it is possible for a user to check an image which is obtained in main photographing when the image is displayed on the display unit 40, after executing these processes by operating the image sensor 22. According to the embodiment, since the image sensor 22 is operated by generating the imaging vertical synchronizing signal SVsync, firstly, and then the display unit 40 is operated by generating the display vertical synchronizing signal DVsync, it is possible to rapidly display an image in the display unit 40.

2. Application Examples

In the above described embodiment, the imaging-displaying apparatus 1 is described as an example of the mirrorless digital single reflex camera; however, the imaging-displaying apparatus 1 can be applied to various electronic apparatuses.

Application Example 1

The imaging-displaying apparatus 1 can be applied to a digital camera in which the lens unit 10 is not exchanged. In this case, contents of the aberration correction process and the phase difference TD may be determined according to at least one of parameters related to optical characteristics of the lens unit 10 such as a focal distance, a zooming rate, a diaphragm value, or a focusing value.

Application Example 2

The imaging-displaying apparatus 1 may be applied to electronic binoculars or an electronic telescope in which magnification is variable. In this case, it is possible to make the shortest delay in time from imaging to displaying by changing contents of the aberration correction process, and determining the phase difference TD along with this according to a magnification (parameter related to optical characteristics of lens).

Application Example 3

When an electronic imaging-displaying system is used instead of a side mirror or a rear-view mirror which is used in a vehicle, the above described imaging-displaying apparatus 1 may be applied as the imaging-displaying system. In the imaging-displaying system in a vehicle, it is necessary to take into consideration that a vehicle moves at high speed. That is, it is important to shorten a delay in time from imaging of the object using the image sensor 22 to displaying an image in the display unit 40 for safe driving. When the above described imaging-displaying apparatus 1 is used, it is possible to make the shortest delay in time from imaging to displaying by changing contents of the aberration correction process according to magnification which is changed using an optical zoom, similarly to the electronic binoculars or the electronic telescope, and determining a phase difference TD according to the changed contents.

3. Modification Examples

The above described each embodiment can be variously modified. Specific modification forms will be exemplified below. Two or more forms which are arbitrarily selected from the following examples can be appropriately combined in a range of not conflicting with each other. In addition, in the modification examples which are described below, descriptions of points common to the above described embodiment of the present invention will be omitted in order to avoid redundant descriptions.

Modification Example 1

In the above described embodiment, the timing control unit 70 generates the display vertical synchronizing signal DVsync by delaying the imaging vertical synchronizing signal SVsync according to the display dot clock signal DCLK; however, the invention is not limited to this, and when it is possible to generate the display vertical synchronizing signal DVsync by delaying the imaging vertical synchronizing signal SVsync at least by a predetermined time which is necessary for image processing, it may be any method.

Figure 9:
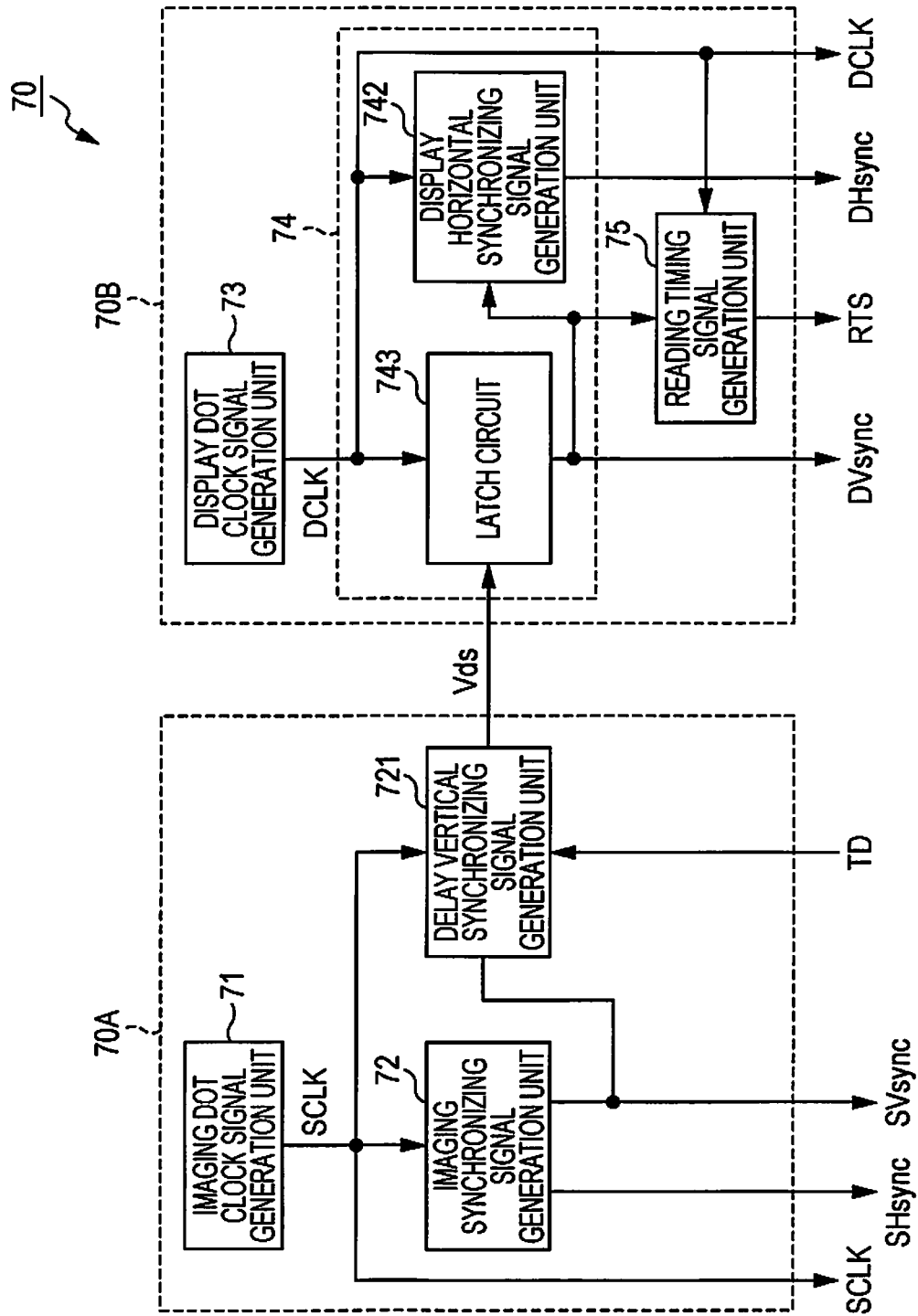
FIG. 9 is a block diagram which illustrates a configuration of a timing control unit according to a modification example.

For example, the timing control unit 70 may be configured as illustrated in FIG. 9. The first timing generator 70A in the example includes a delay vertical synchronizing signal generation unit 721. The delay vertical synchronizing signal generation unit 721 generates a delay vertical synchronizing signal Vds by delaying the imaging vertical synchronizing signal SVsync by the phase difference TD using the imaging dot clock signal SCLK.

Subsequently, the display synchronizing signal generation unit 74 includes a latch circuit 743 instead of the display vertical synchronizing signal generation unit 741. The latch circuit 743 generates the display vertical synchronizing signal DVsync by latching the delay vertical synchronizing signal Vds using the display dot clock signal DCLK.

Modification Example 2

In the above described embodiment and modification examples, the case in which the display unit 40 includes the liquid crystal panel 42 has been exemplified; however, the invention is not limited thereto, and a display element such as an organic light emitting diode (OLED) panel, and a plasma display panel may be used.

Modification Example 3

In the above described embodiment and modification examples, a data transmission between the image signal generation unit 30 and the display unit 40 is performed using the parallel interface; however, the data transmission may be performed using a serial interface of low voltage differential (LVDS).

Modification Example 4

In the above described embodiment and modification examples, the display unit 40 is accommodated in the imaging-displaying apparatus 1; however, the invention is not limited to this, and the display unit 40 may be configured as a finder (display device), or the like, which is connected to the outside of a digital camera.

According to an aspect of the present disclosure, there is provided an imaging apparatus which includes an imaging unit which outputs an imaging signal denoting a captured image; a storage unit; an image processing unit which generates an image signal by performing image processing with respect to the imaging signal, and writes the signal in the storage unit; an image signal output unit which reads the image signal from the storage unit, and outputs the signal to the display unit; and a timing control unit which generates a first vertical synchronizing signal for driving the imaging unit, and supplies the signal to the imaging unit, generates a second vertical synchronizing signal which is obtained by delaying the first vertical synchronizing signal at least by a predetermined time which is necessary for the image processing, and supplies the signal to the display unit, and controls the image signal output unit so that the image signal is read from the storage unit by being delayed by a phase difference between the first vertical synchronizing signal and the second vertical synchronizing signal, after outputting of the imaging signal from the imaging unit.

According to the aspect, the first vertical synchronizing signal which controls the imaging unit is firstly generated, and the second vertical synchronizing signal which controls the display unit is generated by delaying the first vertical synchronizing signal. Accordingly, since it is possible to cause the imaging unit to be operated before the display unit, a state can be prevented in which the first vertical synchronizing signal is not supplied to the imaging unit, and it is not possible to output an imaging signal, even when the second vertical synchronizing signal is supplied to the display unit, and it is possible to display an image on the display unit. As a result, it is possible to shorten a delay in time until an image is displayed on the display unit. In addition, since the second vertical synchronizing signal is generated by delaying the first vertical synchronizing signalby at least a predetermined time which is necessary for image processing, it is possible to perform a control so that the image processing is punctually performed, and to shorten a delay in time from an output of an imaging signal from the imaging unit to a display of an image on the display unit.

In the imaging apparatus, it is preferable that the timing control unit controls the image signal output unit so that the image signal is read from the storage unit by being delayed by the phase difference between the first vertical synchronizing signal and the second vertical synchronizing signal, after outputting of the imaging signal from the imaging unit. Since the second vertical synchronizing signal is generated by delaying the first vertical synchronizing signal at least by a predetermined time which is necessary for image processing, the phase difference between the first vertical synchronizing signal and the second vertical synchronizing signal is a predetermined time or more which is necessary for image processing. Since an image signal is read from the storage unit by being delayed by the phase difference after outputting of an imaging signal from the imaging unit, it is possible to supply the image signal after being subjected to the image processing to the display unit.

In the imaging apparatus, it is preferable that the timing control unit includes a first timing control unit which generates the first vertical synchronizing signal based on a first clock signal, and supplies the signal to the imaging unit, and a second timing control unit which generates the second vertical synchronizing signal which is obtained by delaying the first vertical synchronizing signal at least by the predetermined time, using a second clock signal of which a frequency is different from that of the first clock signal, and supplies the second vertical synchronizing signal to the display unit. According to the aspect, it is possible to cause a predetermined phase difference between a start of a frame of the imaging unit and a start of a frame of the display unit, even when a frequency of the first clock signal which causes the imaging unit to operate is different from a frequency of the second clock signal which causes the display unit to operate.

In the imaging apparatus, it is preferable that the timing control unit includes the first timing control unit which generates the first vertical synchronizing signal based on the first clock signal, supplies the first vertical synchronizing signal to the imaging unit, and generates a delay vertical synchronizing signal in which the first vertical synchronizing signal is delayed at least by the predetermined time using the first clock signal, and the second timing control unit which generates the second vertical synchronizing signal by latching the delay vertical synchronizing signal using the second clock signal of which a frequency is different from that of the first clock signal. According to the aspect, it is possible to cause a predetermined phase difference between the start of the frame of the imaging unit and the start of the frame of the display unit, even when the frequency of the first clock signal which causes the imaging unit to operate is different from the frequency of the second clock signal which causes the display unit to operate.

According to another aspect of the present invention, there is provided an imaging-displaying apparatus which includes the above described imaging apparatus, and a display unit which displays an image signal which is output from an image signal output unit. According to the aspect, it is possible to shorten a delay in time from imaging to displaying.

According to still another aspect of the present invention, there is provided a control method of an imaging-displaying apparatus which includes an imaging unit which outputs an imaging signal denoting a captured image; a storage unit; an image processing unit which generates an image signal by performing image processing with respect to the imaging signal, and writes the signal in the storage unit; a display unit; and an image signal output unit which reads the image signal from the storage unit, and outputs the signal to the display unit, the method including generating a first vertical synchronizing signal for driving the imaging unit, and supplying the signal to the imaging unit; generating a second vertical synchronizing signal by delaying the first vertical synchronizing signal at least by a predetermined time which is necessary for the image processing, and supplying the signal to the display unit; and controlling the image signal output unit so that the image signal is read from the storage unit by being delayed by a phase difference between the first vertical synchronizing signal and the second vertical synchronizing signal, after outputting of the imaging signal from the imaging unit.

According to the aspect, the first vertical synchronizing signal for controlling the imaging unit is firstly generated, and the second vertical synchronizing signal for controlling the display unit is generated by delaying the first vertical synchronizing signal. Accordingly, since it is possible to cause the imaging unit to be operated before the display unit, a state can be prevented in which the first vertical synchronizing signal is not supplied to the imaging unit, and it is not possible to output an imaging signal, even when the second vertical synchronizing signal is supplied to the display unit, and it is possible to display an image on the display unit. As a result, it is possible to shorten a delay in time until displaying of an image on the display unit. In addition, since the second vertical synchronizing signal is generated by delaying the first vertical synchronizing signal by a predetermined time which is necessary for image processing, it is possible to perform a control so that the image processing is punctually performed, and to shorten a delay in time from an output of an imaging signal from the imaging unit to a display of an image on the display unit.

REFERENCE SIGNS LIST

1 Imaging-displaying apparatus
10 Lens unit
20 Imaging unit
22 Image sensor
30 Image signal generation unit
31 Image processing unit
32 VRAM
33 Image signal output unit
40 Display unit
41 EVF controller
42 Liquid crystal panel
50 CPU
60 Operation unit
70 Timing control unit
70A First timing generator
70B Second timing generator
721 Delay vertical synchronizing signal generation unit
741 display vertical synchronizing signal generation unit

What is claimed is:

1. An imaging apparatus comprising:
an imaging unit which outputs an imaging signal denoting a captured image;
a storage unit;
an image processing unit which generates an image signal by performing image processing with respect to the imaging signal, and writes the image signal in the storage unit;
an image signal output unit which reads the image signal from the storage unit, and outputs the image signal to a display unit; and
a timing control unit which
generates a first vertical synchronizing signal for driving the imaging unit and supplies the first vertical synchronizing signal to the imaging unit; and
generates a second vertical synchronizing signal which is obtained by delaying the first vertical synchronizing signal at least by a predetermined time which is variable according to contents of the image processing performed and supplies the second vertical synchronizing signal to the display unit,
wherein the timing control unit controls the image signal output unit so that the image signal is read from the storage unit by being delayed by a phase difference between the first vertical synchronizing signal and the second vertical synchronizing signal, after outputting of the imaging signal from the imaging unit.

2. The imaging apparatus according to claim 1,
wherein the contents of the image processing performed are contents of the aberration correction process.

3. The imaging apparatus according to claim 2,
wherein the imaging unit includes lens unit, and
wherein the contents of aberration correction process are determined according to at least one of parameters related to optical characteristics of the lens unit including a focal distance, a zooming rate, a diaphragm value, a focusing value, or a magnification.

4. The imaging apparatus according to claim 1,
wherein the timing control unit includes
a first timing control unit which generates the first vertical synchronizing signal based on a first clock signal, and supplies the first vertical synchronizing signal to the imaging unit, and
a second timing control unit which generates the second vertical synchronizing signal which is obtained by delaying the first vertical synchronizing signal at least by the predetermined time, using a second clock signal of which a frequency is different from that of the first clock signal, and supplies the second vertical synchronizing signal to the display unit.

5. An imaging-displaying apparatus comprising:
the imaging apparatus according to claim 1; and
a display unit which displays an image signal which is output from an image signal output unit.

6. A control method of an imaging-displaying apparatus which includes an imaging unit which outputs an imaging signal denoting a captured image; a storage unit; an image processing unit which generates an image signal by performing image processing with respect to the imaging signal, and writes the image signal in the storage unit; a display unit; and an image signal output unit which reads the image signal from the storage unit, and outputs the image signal to the display unit, the method comprising:
generating a first vertical synchronizing signal for driving the imaging unit, and supplying the first vertical synchronizing signal to the imaging unit;
generating a second vertical synchronizing signal by delaying the first vertical synchronizing signal at least by a predetermined time which is variable according to contents of the image processing performed; and
controlling the image signal output unit so that the image signal is read from the storage unit by being delayed by a phase difference between the first vertical synchronizing signal and the second vertical synchronizing signal, after outputting of the imaging signal from the imaging unit.

7. The control method of the imaging apparatus according to claim 6,
wherein the contents of the image processing performed are contents of the aberration correction process.

8. The control method of the imaging apparatus according to claim 7,
wherein the imaging unit includes lens unit, and wherein the contents of aberration correction process are determined according to at least one of parameters related to optical characteristics of the lens unit including a focal distance, a zooming rate, a diaphragm value, a focusing value, or a magnification.

* * * * *